United States Patent
Chen et al.

(10) Patent No.: US 12,504,426 B2
(45) Date of Patent: Dec. 23, 2025

(54) METHOD OF DISTINGUISHABLY DETECTING BIOMARKERS WITH CROSS-REACTIVITY IN BIOLOGICAL SAMPLE

(71) Applicant: Helios Bioelectronics Inc., Zhubei (TW)

(72) Inventors: Wen-Yih Chen, Kaohsiung (TW); Hardy Wai-Hong Chan, New Taipei (TW); Yuh-Shyong Yang, Hsinchu (TW); Ching-Wei Tsai, Zhubei (TW); Wei-Jane Chiu, Houlong Township (TW); Yi-Shao Liu, Zhubei (TW); Lin-Ai Tai, Zhubei (TW)

(73) Assignee: Helios Bioelectronics Inc., Zhubei (TW)

( * ) Notice: Subject to any disclaimer, the term of this patent is extended or adjusted under 35 U.S.C. 154(b) by 299 days.

(21) Appl. No.: 18/201,461

(22) Filed: May 24, 2023

(65) Prior Publication Data
US 2024/0393325 A1   Nov. 28, 2024

(51) Int. Cl.
*G01N 33/543* (2006.01)
*G01N 33/00* (2006.01)

(52) U.S. Cl.
CPC ..... *G01N 33/5438* (2013.01); *G01N 33/0034* (2013.01)

(58) Field of Classification Search
CPC ........... G01N 27/4145; G01N 33/0034; G01N 33/53; G01N 33/5438; G01N 33/689
See application file for complete search history.

(56) References Cited

U.S. PATENT DOCUMENTS

| | | | |
|---|---|---|---|
| 10,527,579 B2 | 1/2020 | Bashir et al. | |
| 2005/0215764 A1 | 9/2005 | Tuszynski et al. | |
| 2011/0166043 A1 | 7/2011 | Nagy et al. | |
| 2022/0126296 A1 | 4/2022 | Huff et al. | |

FOREIGN PATENT DOCUMENTS

| | | | |
|---|---|---|---|
| TW | 201530141 A | 8/2015 | |
| TW | 201938200 A | 10/2019 | |
| WO | WO 2020/037250 A2 | 2/2020 | |

OTHER PUBLICATIONS

A. Sinha, An integrated microfluidic system with field-effect-transistor sensor arrays for detecting multiple cardiovascular biomarkers from clinical sample, Biosensors and Bioelect4rocnics, 2019, 129, pp. 156-163 (Year: 2019).*

(Continued)

*Primary Examiner* — C. Sun
(74) *Attorney, Agent, or Firm* — Crowell & Moring LLP (57) ABSTRACT

The present disclosure relates to a method of distinguishably detecting two biomarkers with cross-reactivity in a biological sample. The method comprises providing two sensor units specific to the two biomarkers, respectively; obtaining binding affinities of a series of known concentrations of the two biomarkers to the sensor units, respectively; contacting the biological sample with the two sensor units to produce two signals; and calculating the concentrations of the two biomarkers in the biological sample with the two signals and the binding affinities.

19 Claims, 3 Drawing Sheets

(56) References Cited

OTHER PUBLICATIONS

D. Park, Multiplexed femtomolar detection of Alzheimer's disease biomarkers in biofluids using a reduced graphene oxide field-effect transistor, Biosensors and Bioelectronics, 2020, 167, 112505 (Year: 2020).*

Chinese-language Office Action issued in Taiwanese Application No. 113119191 dated Nov. 21, 2024 with partial English translation (6 pages).

Extended European Search Report issued in European Application No. 24177685.5 dated Dec. 5, 2024 (7 pages).

Cheng, S. et al., "Label-free detection of tumor markers using field effect transistor (FET)-based biosensors for lung cancer diagnosis", Sensors and Actuators B: Chemical, 2015, pp. 329-334, vol. 212, XP029146121 (6 Pages).

* cited by examiner

FIG. 1

FIG. 2 cTn I (pI 9.9): Positive E-signal

Sensing buffer: pH 7.4 cTn T (pI 4.88): Negative E-signal

FIG. 3

METHOD OF DISTINGUISHABLY DETECTING BIOMARKERS WITH CROSS-REACTIVITY IN BIOLOGICAL SAMPLE

FIELD OF THE INVENTION

The present disclosure relates to methods for distinguishably detecting biomarkers with cross-reactivity in a biological sample. Particularly, the present disclosure relates to methods of using a transducer for distinguishably detecting biomarkers with cross-reactivity in a biological sample.

BACKGROUND OF THE INVENTION

Various techniques have been developed to detect the presence of one or more analytes in an assay. In many biological assays, including assays where micro- or nanoparticles are used for detecting the presence and/or amount of one or more analytes in a biological sample, the generation of a signaling event is used to detect the presence of the analyte. However, such biological assays known in the art have limitations such as false positive results. For example, immunoassay (e.g., enzyme linked immunoSorbent assay (ELISA)) faces a problem that a different analytes generate binding reaction to the same target and thus give a false positive result. Thus, it would be desirable to develop methods capable of distinguishably detecting a plurality of biomarkers.

SUMMARY OF THE INVENTION

The present disclosure provides a novel method of distinguishably detecting biomarkers with cross-reactivity in a biological sample with high quantification accuracy.

In some embodiments of the disclosure, the method of distinguishably detecting two biomarkers with cross-reactivity in a biological sample, comprising:
  providing two sensor units specific to the two biomarkers, respectively, each sensor unit comprising a transducer on the surface thereof;
  obtaining binding affinities of a series of known concentrations of the two biomarkers to the sensor units, respectively, under an operation condition where one of the biomarker is positively charged and the other is negatively charged;
  contacting the biological sample with the two sensor units under the operation condition to produce two signals; and
  calculating the concentrations of the two biomarkers in the biological sample with the two signals and the binding affinities.

Examples of the biological sample include, but are not limited to cell or tissue extraction, blood, serum, plasma, cerebrospinal fluid, urine, saliva, sputum, or pleural effusion.

Examples of the biomarker include, but are not limited to a protein, glycoprotein, lipoprotein, apolipoprotein, peptide, DNA, RNA, hormone, aptamer, or small molecular compound.

In some embodiments of the disclosure, the transducer is electronic sensing. In some embodiments of the disclosure, electronic sensing is field effect transistor comprising a source, drain, gate, and sensing surface.

In some embodiments of the disclosure, the sensor units are located in an array.

In some embodiments of the disclosure, each sensor unit further comprises a readout circuit block.

In some embodiments of the disclosure, the sensor unit further comprises an affinity molecule specific to one of the two biomarkers. Examples of the affinity molecule include, but are not limited to a ligand or a probe. Examples of the ligand include, but are not limited to a protein, antibody, aptamer, DNA, RNA, or molecule with specific functional group.

In some embodiments of the disclosure, the operation condition is tuned by adjusting condition of: chemical modification, buffer, charge, temperature, pH, ionic concentration, flow rate, surfactant, or additive chemicals or a combination thereof.

Examples of the signal include, but are not limited to electric current, electric potential, electric voltage, electric conductivity, electric field, electric capacitance, electric current, electron, or electron hole.

In some embodiments of the disclosure, the binding affinity is represent by coefficients and constants of binding curves of a series of known concentrations of the two biomarkers to the sensor units, respectively.

In some embodiments of the disclosure, the method comprises
  providing a first sensor unit specific to a first biomarker and a second sensor unit specific to a second biomarker;
  obtaining a binding curve of a series of known concentrations of the first biomarker to the first sensor unit to provide a coefficient $\alpha 11$ and a constant $\beta 11$, a binding curve of a series of known concentrations of the first biomarker to the second sensor unit to provide a coefficient $\alpha 12$ and a constant $\beta 12$, a binding curve of a series of known concentrations of the second biomarker to the first sensor unit to provide a coefficient $\alpha 21$ and a constant $\beta 21$, a binding curve of a series of known concentrations of the second biomarker to the second sensor unit to provide a coefficient $\alpha 22$ and a constant $\beta 22$, under the operation condition where the first biomarker is positively charged and the second biomarker is negatively charged;
  contacting the biological sample with the first sensor unit under the operation condition to produce a first signal S1 and with the second sensor unit under the operation condition to produce a second signal S2; and
  calculating the concentration C1 of the first biomarker and the concentration C2 of the second biomarker with the first signal, second signal and the coefficients and constants by the following equations:

$$S1 = (\alpha 11 \times C1 + \beta 11) + (\alpha 21 \times C2 + \beta 21)$$
$$S2 = (\alpha 12 \times C1 + \beta 12) + (\alpha 22 \times C2 + \beta 22)$$

The present disclosure provides a sensing system for distinguishably detecting two biomarkers with cross-reactivity in a biological sample, comprising: two sensor units specific to the two biomarkers, respectively, each sensor unit comprising a transducer on the surface thereof, a readout circuit, a control and calculation block; wherein the calculation block is a non-transitory computer-readable medium storing program comprising: code for receiving information describing two signals corresponding to the biomarkers obtained from the method of distinguishably detecting two biomarkers with cross-reactivity in a biological sample as disclosed herein and code for calculating the concentrations of the two biomarkers in the biological sample with the two signals and the binding affinities.

In some embodiments of the disclosure, the two sensor units comprises a first sensor unit specific to a first biomarker and a second sensor unit specific to a second biomarker, and the code for calculating the concentration C1 of the first biomarker and the concentration C2 of the second biomarker in the biological sample performs resolving the following equations:

$$S1 = (\alpha 11 \times C1 + \beta 11) + (\alpha 21 \times C2 + \beta 21)$$
$$S2 = (\alpha 12 \times C1 + \beta 12) + (\alpha 22 \times C2 + \beta 22);$$

wherein a binding curve of a series of known concentrations of the first biomarker to the first sensor unit to provide a coefficient $\alpha 11$ and a constant $\beta 11$, a binding curve of a series of known concentrations of the first biomarker to the second sensor unit to provide a coefficient $\alpha 12$ and a constant $\beta 12$, a binding curve of a series of known concentrations of the second biomarker to the first sensor unit to provide a coefficient $\alpha 21$ and a constant $\beta 21$, a binding curve of a series of known concentrations of the second biomarker to the second sensor unit to provide a coefficient $\alpha 22$ and a constant $\beta 22$, under the operation condition where the first biomarker is positively charged and the second biomarker is negatively charged; the biological sample with the first sensor unit under the operation condition produces a first signal S1 and with the second sensor unit under the operation condition produces a second signal S2.

The present disclosure also provides a method of detecting or diagnosing if a subject has, or is at risk of developing a disease or assessing a prognosis of the disease, comprising the method of distinguishably detecting two biomarkers with cross-reactivity in a biological sample as disclosed herein, wherein the disease relates to at least one of the biomarkers.

DETAILED DESCRIPTION OF THE INVENTION

The present disclosure develops a method to distinguishably detect a plurality of biomarkers in a biological sample.

It must be noted that, as used in the specification and the appended claims, the singular forms "a," "an," and "the" include plural referents unless the context clearly dictates otherwise.

As used herein, the term "cross-reactivity" refers to the ability of an affinity molecule (such as an antibody) specific for a first molecule (such as an antigen), to react with a second molecule. For example, an antibody is cross reactive if it binds to an epitope other than the one that induced its formation. The cross reactive epitope generally contains many of the same complementary structural features as the inducing epitope, and in some cases, may actually fit better than the original.

In one aspect, the present disclosure provides a method of distinguishably detecting two biomarkers with cross-reactivity in a biological sample, comprising:
  providing two sensor units specific to the two biomarkers, respectively, each sensor unit comprising a transducer on the surface thereof;
  obtaining binding affinities of a series of known concentrations of the two biomarkers to the sensor units, respectively, under an operation condition where one of the biomarker is positively charged and the other is negatively charged;
  contacting the biological sample with the two sensor units under the operation condition to produce two signals; and
  calculating the concentrations of the two biomarkers in the biological sample with the two signals and the binding affinities.

Various biological samples can be applied to the method of the present disclosure. As used herein, the term "sample" or "biological sample" refers to a biological material isolated from a subject. The biological sample may contain any biological material suitable for detecting the desired biomarkers, and may comprise cellular and/or non-cellular material from the subject. The sample can be isolated from any suitable biological tissue or fluid. In some embodiments, the biological sample is cell or tissue extraction, blood, blood plasma, serum, plasma, cerebrospinal fluid, urine, saliva, sputum, or pleural effusion.

The method of the present disclosure can distinguishably detect two or more biomarkers in a biological sample. Examples of the biomarker include, but are not limited to, protein, glycoprotein, lipoprotein, apolipoprotein, peptide, DNA, RNA, hormone, aptamer and small molecular compound. In some embodiments, the biomarker is protein (such as antibody, antigen or ligand), glycoprotein, lipoprotein, apolipoprotein or peptide.

In some embodiments of the disclosure, the sensor units specific to the two biomarkers comprising a transducer on the surface thereof are provided to detect the reaction signal generated from the method of the disclosure. In some embodiments of the disclosure, the sensor unit further comprises an affinity molecule specific to one of the two biomarkers. In some embodiments of the disclosure, the sensor units are located in an array. The sensing is achieved by a grouping sensor array wherein each sensor unit comprises a transducer, a readout circuit block. In one embodiment, the sensor will be separated 2 parts including transducer with solid surface and surface with specific chemical modification. The sensor array detects the surface status of the transducer. The read out circuit transfers the sensor signals to digital format. The control and calculate block will control the read out circuit and calculate the sensor result. The transducer converts a signal in one form of energy to a signal. Various transducers can be used in the method of the present disclosure. In some embodiments, the transducer is electronic sensing, optical sensing, pressure sensing, or weight sensing. For example, electrical signals are converted to and from other physical quantities (energy, force, torque, light, motion, position, etc.) The electrical signal includes but is not limited to changes of electric current, electric potential, electric voltage, electric conductivity, electric field, electric capacitance, electric current, electron, or electron hole. In one embodiment of the disclosure, the electrical change is a threshold voltage shift change. In some embodiments of the disclosure, the electric change is detected by an electric change detecting element. The electrical change includes but is not limited to increase of the net electrical charges.

In one embodiment, the electronic sensing is performed by a field-effect transistor (FET). In a further embodiment, the FET comprises a source, drain, and sensing surface. FET is a semiconductor electronic component extremely sensitive to a surface charge. Among several kinds of FET, silicon nanowire (SiNW) FET biosensor refers to a sensing element where the surface of silicon nanowires is modified with a recognizing molecule. When the FET is exposed to an aqueous environment comprising a target molecule such as proteins, DNA, or RNA, the target molecule binds to the recognizing molecule on the surface of the silicon nanowire field-effect transistor. In this case, the electric field formed by the electrical charges carried by the target molecule affects the number of electrons or holes of the SiNW-FET, triggering a rise or fall of electrical conductivity. By monitoring the change of the electrical conductivity, the presence and even the concentration of the target molecule can be determined.

The solid surface of the transducer refers to a solid support including but not limited to a polymer, paper, fabric, or glass. The solid surface to be employed varies depending on the signal to be detected. For example, when the method adopts a field-effect transistor to monitor the signal, the solid surface is a transistor surface of the field-effect transistor; when the method adopts a surface plasmon resonance, the solid surface is a metal surface of a surface plasmon resonance. In a preferred embodiment of the invention, the material of the solid surface is silicon; preferably polycrystalline silicon or single crystalline silicon; more preferably polycrystalline silicon.

In some embodiments of the disclosure, on the surface of the transducer, the affinity molecule, such as ligand or probe, is coated or coupled as the recognizing molecule binds to the biomarker to form the capturing complex. When the biomarkers interact with the surface of the transducer, the reaction of forming capturing complex cause single change. Subsequently, the sensor can detect the biomarker by detecting the single change. In some embodiments, the ligand is a protein, antibody, aptamer, DNA, RNA, or molecule with specific functional group.

The biological sample contains a number of biomarkers. Two or more biomarkers may bind to the same affinity molecule to cause false positive result. As disclosed herein, binding affinities of a series of known concentrations of the two biomarkers to the sensor units, respectively, are provided under an operation condition where one of the biomarker is positively charged and the other is negatively charged. For example, there are two kinds of FET biosensor based on the n- or p-doping composition of source and drain: n-type with electrons as the main charge carriers and p-type with holes as the primary charge carriers. In an n-type FET system, if the affinity molecule detects positively charged biomarker, the charge carriers (electrons) accumulate on the sensing channels and increases the conductance. If negatively charged biomarker are recognized, the conductance decreases due to the depletion of the electrons. Conversely, for a p-type FET system, binding with positively-charged biomarker results in conductance decline due to a reduction of the charge carriers (holes) and capturing negatively-charged biomarker raises the conductance because of hole accumulation.

Not willing limited by theory, it is believed that the charge of biomarkers in buffer solution is affected by pH. The isoelectric point (pI) is the pH at which a biomarker carries no net electrical charge or is electrically neutral. It is noteworthy that the net charge of a specific biomarker can be positive or negative depending on its pI value relative to the pH of the buffer solution. If pI is larger than the pH of the solution, hydrogen ions protonate the biomarker of which the net charge of biomarker is positive. On the contrary, the net charge is negative if the pI is smaller than the pH of the solution. To differentiate the signals of two or more biomarkers that binding to the capture on FET surface, it can be done by tunning the sensing buffer pH to control the charge of target molecules.

The conditions change the binding orientation, target charge distribution, target binding amounts, and the association or dissociation constant of recognition pairs. Examples of the operation conditions include, but are not limited to, chemical modification, buffer, charge, temperature, pH, ionic concentration, flow rate, surfactant, additive chemicals and a combination thereof.

In some embodiments of the disclosure, the binding affinity is represented by coefficients and constants of binding curves of a series of known concentrations of the two biomarkers to the sensor units, respectively.

In some embodiments of the disclosure, the method comprises
providing a first sensor unit specific to a first biomarker and a second sensor unit specific to a second biomarker;
obtaining a binding curve of a series of known concentrations of the first biomarker to the first sensor unit to provide a coefficient $\alpha 11$ and a constant $\beta 11$, a binding curve of a series of known concentrations of the first biomarker to the second sensor unit to provide a coefficient $\alpha 12$ and a constant $\beta 12$, a binding curve of a series of known concentrations of the second biomarker to the first sensor unit to provide a coefficient $\alpha 21$ and a constant $\beta 21$, a binding curve of a series of known concentrations of the second biomarker to the second sensor unit to provide a coefficient $\alpha 22$ and a constant $\beta 22$, under the operation condition where the first biomarker is positively charged and the second biomarker is negatively charged;
contacting the biological sample with the first sensor unit under the operation condition to produce a first signal S1 and with the second sensor unit under the operation condition to produce a second signal S2; and
calculating the concentration C1 of the first biomarker and the concentration C2 of the second biomarker with the first signal, second signal and the coefficients and constants by the following equations:

$$S1 = (\alpha 11 \times C1 + \beta 11) + (\alpha 21 \times C2 + \beta 21)$$
$$S2 = (\alpha 12 \times C1 + \beta 12) + (\alpha 22 \times C2 + \beta 22)$$

In another aspect, the present invention provides a sensing system for distinguishably detecting two biomarkers with cross-reactivity in a biological sample, comprising: two sensor units specific to the two biomarkers, respectively, each sensor unit comprising a transducer on the surface thereof, a readout circuit, a control and calculation block; wherein the calculation block is a non-transitory computer-readable medium storing program comprising: code for receiving information describing two signals corresponding to the biomarkers obtained from the method of distinguishably detecting two biomarkers with cross-reactivity in a biological sample as disclosed herein and code for calculating the concentrations of the two biomarkers in the biological sample with the two signals and the binding affinities.

In some embodiments of the disclosure, the two sensor units comprises a first sensor unit specific to a first biomarker and a second sensor unit specific to a second biomarker, and the code for calculating the concentration C1 of the first biomarker and the concentration C2 of the second biomarker in the biological sample performs resolving the following equations:

$$S1 = (\alpha 11 \times C1 + \beta 11) + (\alpha 21 \times C2 + \beta 21)$$
$$S2 = (\alpha 12 \times C1 + \beta 12) + (\alpha 22 \times C2 + \beta 22);$$

wherein a binding curve of a series of known concentrations of the first biomarker to the first sensor unit to provide a coefficient $\alpha 11$ and a constant $\beta 11$, a binding curve of a series of known concentrations of the first biomarker to the second sensor unit to provide a coefficient $\alpha 12$ and a constant $\beta 12$, a binding curve of a series of known concentrations of the second biomarker to the first sensor unit to provide a coefficient $\alpha 21$ and a constant $\beta 21$, a binding curve of a series of known concentrations of the second biomarker to the second sensor unit to provide a coefficient $\alpha 22$ and a constant $\beta 22$, under the operation condition where the first biomarker is positively charged and the second biomarker is negatively charged; the biological sample with the first sensor unit under the operation condition produces a first signal S1 and with the second sensor unit under the operation condition produces a second signal S2. Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The present disclosure also provides a method of detecting or diagnosing if a subject has, or is at risk of developing a disease or assessing a prognosis of the disease, comprising the method of distinguishably detecting two biomarkers with cross-reactivity in a biological sample as disclosed herein, wherein the disease relates to at least one of the biomarkers.

Example 1 Distinguishably Detecting CA19-9 and CA 244 in a Biological Sample

The cross reactivity of CA19-9 & CA242 is essentially a problem for the quantification of clinical specimen, CA 242 antigen with CA 19-9 antibody produced a similar binding curve to CA 242 antigen and its corresponding antibody, in this practice, FET biosensor is used to resolve the cross-reactivity issue of cancer biomarkers, CA19-9 & CA242, by tunning the buffer condition and coated antibody on the biosensor surface.

The arrayed FET biosensors is pretreated by $O_2$ plasma, piranha solution ($H_2SO_4:H_2O_2=3:1$) or standard clean solution 1/2 (SC1/SC2). The water contact angle of chip is less than 5 degree due to the hydroxyl groups on the chip surface. To covalently immobilize the antibody on the sensor surface, the functionalized linker layers, such as (3-aminopropyl) triethoxysilane (APTES) and (3-glycidoxypropyl) trimethoxysilane (GPTMS), can be used on the hydroxyl functionalized FET surface. For APTES linker layer, the attaching antibody is via glutaraldehyde (GA). Another method allow antibody to be directly attached to GPTMS modified FET biosensor. For liquid phase modification, the chips are incubated in 1-5 V/V % APTES, GPTMS in 99% EtOH solution at room temperature for 1 or 2 hrs. After incubation, the chips were rinsed by EtOH, deionized water (di-$H_2O$), and then dry by $N_2$ gas. The linker layer modified chips will be stored in the humility-controlled box (RH=20%). The surface linker layer modification of FET biosensor can be carried out by gas phase modification, e.g. the molecular layer deposition (MLD), chemical vapor deposition (CVD) and atomic layer deposition (ALD), etc. In general, gas phase surface modification is more uniform than liquid phase modification and easily to scale up. The modification process is to put the sensor chip or wafer in the chamber, following by treating with $O_2$ plasma or Ozone in almost vacuum environment, then tune on the valve to suck 1-10 torr vaporized APTES or GPTMS into the vacuum chamber, then the GTPMS or APTES is depositing on the sensor surface for 10-2 hr for further chemical reaction forming to chemically graft the linker layer on the surface. After annealing at 110° C., the linker layer modified chips or wafers are also stored in the humility-controlled box (RH=20%). Other type of linker layer can also be used by both gas phase or liquid phase, for example: thiol-, azide-, aldehyde- or diol-based functionalized linker layers.

The antibodies are dispensed on the linker layer modified sensor surface with the spotting size of 50 to 170 mm. The concentrations of antibodies are ranging from 10-500 μg/mL in the spotting buffer composing of 100 mM BTP with 30% Glycerol or 30% ethyl glycol at pH 6.0. After overnight incubation at 37° C. with the humility more than 70-90%, the non-bonding protein is washed out by 10 mM BTP pH 7+5% DMSO+0.01% Triton X-100, then dry by $N_2$ gas for further antigen binding test. To resist non-specific binding from analytes or sample, the chemical-blockers and bio-blockers are used. The chips are incubated in 3% BSA (Bovine serum albumin)+PEG (polyethylene glycol)-amine with different molecular weight, PEG550-PEG20K.

The measurement workflow is carried out by inserting chip cartridge in the instrument. First measurement is to do the blank measurement by sensing buffer (1 mM BTP pH6+0.01% Triton X-100), then prepare different concentration of antigen in the PBS buffer or spike-in serum. The binding assays were performed at 37° C. for 15 min. After antigen binding, the chips were washed by 10 mM BTP pH 7+5% DMSO+0.01% Triton X-100 for 3-5 times, and then washed by sensing buffer for 3-5 times. The second measurement is performed to obtain the binding signal. The binding signal is obtained based on the change of threshold voltage (Vth) from subtracting the $2^{nd}$ measurement to $1^{st}$ measurement.

Figure 1:
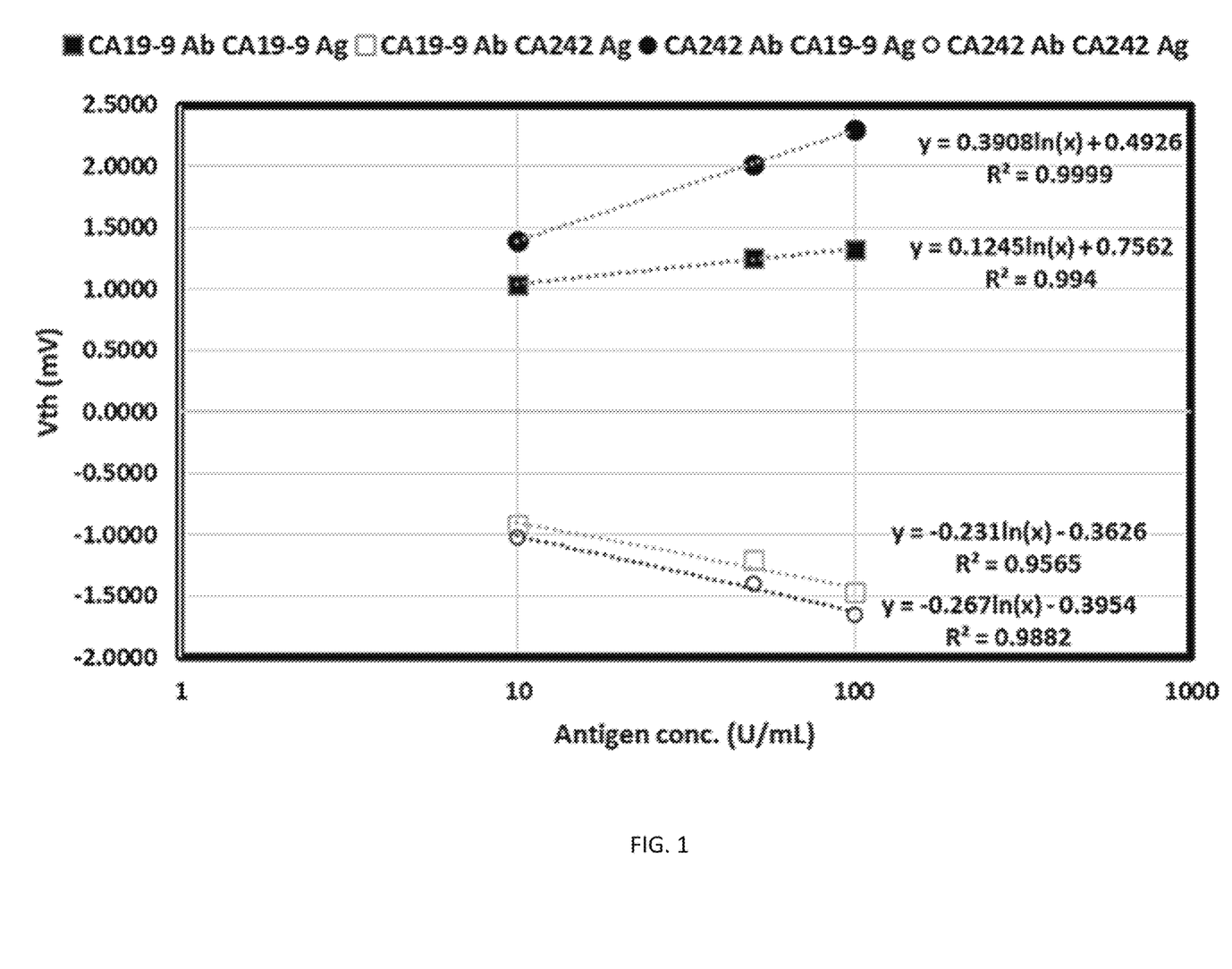
FIG. 1 shows the binding curve of CA19-9 and CA242 on the FET biosensor surface with anti-CA19-9 and anti-CA242 antibodies spotting.

The binding curve of CA19-9 and CA-242 with two antibodies was plot as a function of target concentration (As shown in FIG. 1). It can be found that the binding signals of CA19-9 antigens increase along with the concentrations of CA19-9 increase for both anti-CA19-9 and anti-CA242 antibodies coated sensors, on the contrary, CA242 antigens adopt negative signal along with the concentrations of CA242 increase.

Figure 2:
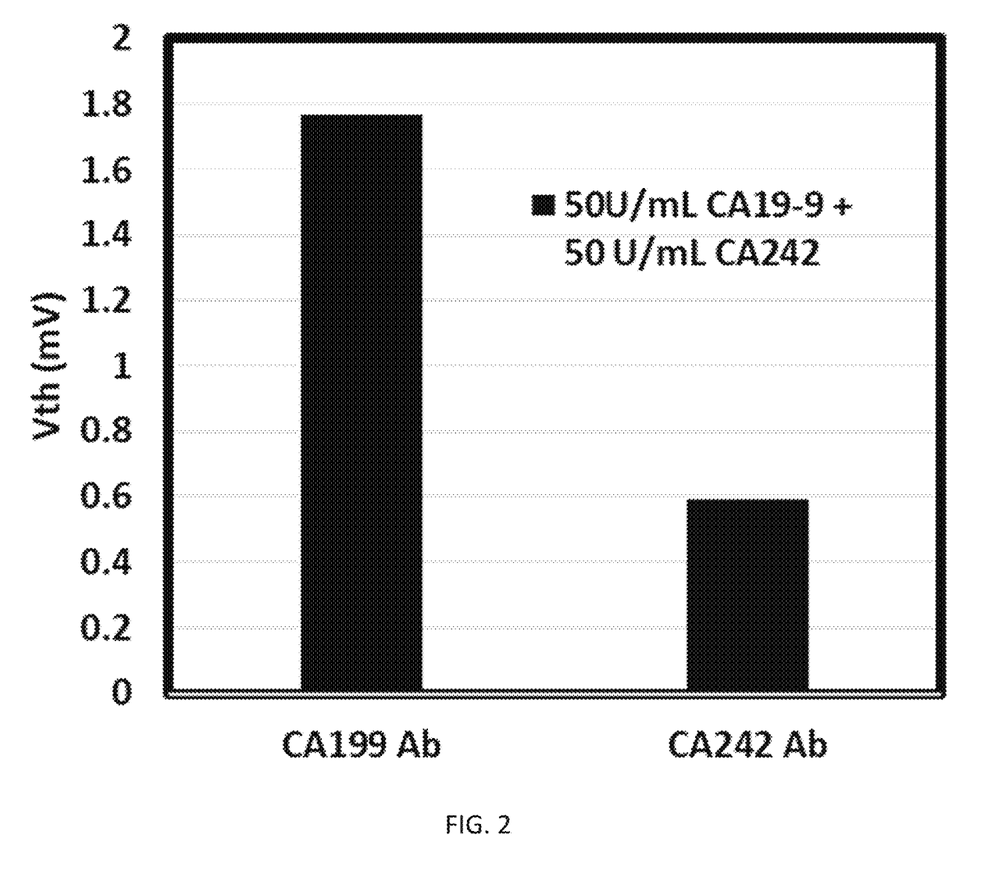
FIG. 2 shows the binding signal of CA19-9 and CA242 mixture with the concentration of 50 U/ml of each antigen on the FET biosensor surface with anti-CA19-9 and anti-CA242 antibodies spotting.

The binding of 50 U/mL CA19-9 and 50 U/mL CA242 mixed sample also performed. As shown in FIG. 2. The binding signal of CA19-9 antibody coated sensor can be determined by equation 1:

$$\text{Signal of } CA19\text{-}9\ Ab = \text{signal of } (CA19\text{-}9\ Ag + CA242\ Ag) \quad \text{(eq. 1)}$$
$$\text{binding to } CA19\text{-}9\ Ab$$
$$= \left(\alpha_{CA19\text{-}9}^{CA19\text{-}9\ Ab}\ln([CA19\text{-}9]) + \beta_{CA19\text{-}9}^{CA19\text{-}9\ Ab}\right) +$$
$$\left(\alpha_{CA242}^{CA19\text{-}9\ Ab}\ln([CA242]) + \beta_{CA242}^{CA19\text{-}9\ Ab}\right)$$

where the values of $\alpha$ and $\beta$ are obtained from the slope and intercept of binding curve in the FIG. 1. The binding signal of CA242 antibody coated sensor can be determined by equation 2:

$$\text{Signal of } CA242\ Ab = \text{signal of } (CA19\text{-}9\ Ag + CA242\ Ag) \quad \text{(eq. 2)}$$
$$\text{binding to } CA242\ Ab$$
$$= \left(\alpha_{CA19\text{-}9}^{CA242\ Ab}\ln([CA19\text{-}9]) + \beta_{CA19\text{-}9}^{CA242\ Ab}\right) +$$
$$\left(\alpha_{CA242}^{CA242\ Ab}\ln([CA242]) + \beta_{CA242}^{CA242\ Ab}\right)$$

The concentration of CA19-9 and CA242 mixture can be resolved by Eq1 and Eq2. The result revealed that the concentrations of CA19-9 and CA242 in the mixture are 49.25 U/ml and 47.37 U/mL, respectively. The quantification accuracy of CA19-9 in the mixture is 98.5% and 94.7% for CA242. The results revealed that FET biosensor can be used to resolve the cross-reactivity issue by tunning the pH of sensing buffer.

Figure 3:
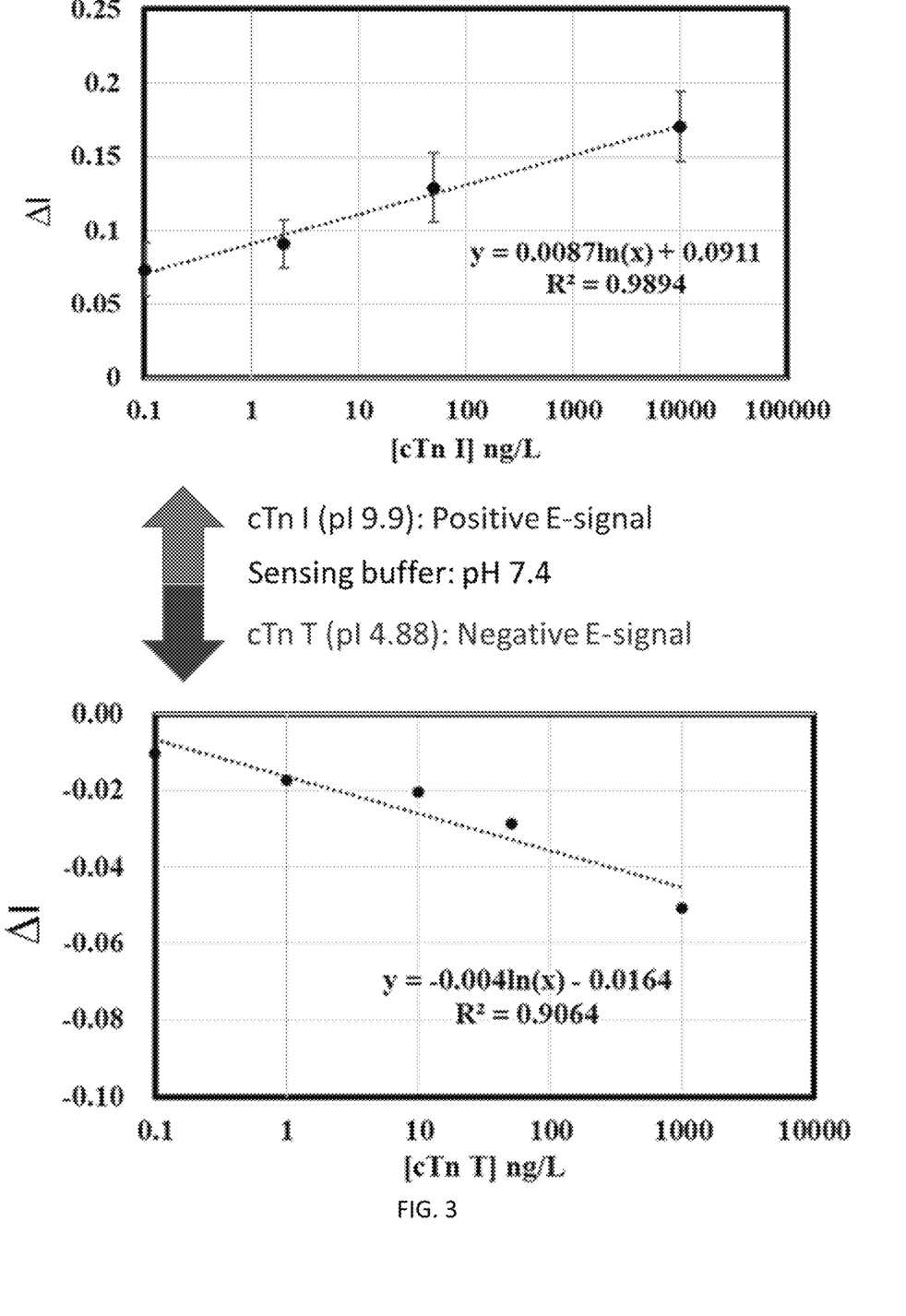
FIG. 3 shows the binding curve of cTn I and cTn T antigen on the FET biosensor surface with anti-cTn I antibody coating and anti-cTn T antibody coating.

Example 2 Distinguishably Detecting Cardiac Troponin I (cTn I) and Cardiac Troponin T (cTn T) in a Biological Sample The cross-reactivity problem also occurred for the detection of cardiac troponin I (cTn I) and cardiac troponin T (cTn T), besides the skeletal/cardiac troponin I and skeletal/cardiac troponin T are also suffered by cross-reactive issue resulting in difficult to precisely obtain the concentration in the sample. The pI of cTn I and cTn T are 9.9 and 4.88, respectively. To make a perfect signal differentiation of cTn I and cTn T detection, the sensing buffer is tuned by 1 mM BTP pH 7.4. As shown in the FIG. 3, it can be found that cTn I and cTn T have positive electrical signal and negatively signal, respectively. Thus, the cross-reactive issue between cTn I and cTn T is able to be resolved by FET biosensor.

While the present disclosure has been described in conjunction with the specific embodiments set forth, many alternatives thereto and modifications and variations thereof will be apparent to those of ordinary skill in the art. All such alternatives, modifications and variations are regarded as falling within the scope of the present disclosure.

The invention claimed is:

1. A method of distinguishably detecting two biomarkers with cross-reactivity in a biological sample, comprising:
providing two sensor units specific to the two biomarkers, respectively, each sensor unit comprising a transducer on a surface thereof, wherein a first sensor unit is specific to a first biomarker and a second sensor unit is specific to a second biomarker;
obtaining binding affinities of a series of known concentrations of the two biomarkers to the two sensor units, respectively, under an operation condition where one of the two biomarker is positively charged and the other is negatively charged, wherein a binding curve of a series of known concentrations of the first biomarker to the first sensor unit to provide a coefficient $\alpha 11$ and constant $\beta 11$, a binding curve of a series of known concentrations of the first biomarker to the second sensor unit to provide coefficient $\alpha 12$ and a constant $\beta 12$, a binding curve of a series of known concentrations of the second biomarker to the first sensor unit to provide a coefficient $\alpha 21$ and a constant $\beta 21$, and a binding curve of a series of known concentrations of the second biomarker to the second sensor unit to provide a coefficient $\alpha 22$ and a constant $\beta 22$ are obtained, under the operation condition where the first biomarker is positively charged and the second biomarker is negatively charged;
contacting the biological sample with the two sensor units under the operation condition to produce two signals, wherein the biological sample is contacted the first sensor unit under the operation condition to produce a first signal S1 and with the second sensor unit under the operation condition to produce a second signal S2; and
calculating the concentrations of the two biomarkers in the biological sample with the two signals and the binding affinities, wherein the concentration C1 of the first biomarker and the concentration C2 of the second biomarker are calculated with the first signal, second signal and the coefficients and constants by the following equations:

$$S1 = (\alpha 11 \times C1 + \beta 11) + (\alpha 21 \times C2 + \beta 21)$$
$$S2 = (\alpha 12 \times C1 + \beta 12) + (\alpha 22 \times C2 + \beta 22)$$

2. The method of claim 1, wherein the biological sample is cell or tissue extraction, blood, serum, plasma, cerebrospinal fluid, urine, saliva, sputum, or pleural effusion.

3. The method of claim 1, wherein one of the two biomarkers is a protein, glycoprotein, lipoprotein, apolipoprotein, peptide, DNA, RNA, hormone, aptamer, or small molecular compound.

4. The method of claim 1, wherein the transducer is electronic sensing.

5. The method of claim 4, wherein the electronic sensing is field effect transistor comprising a source, drain, gate, and sensing surface.

6. The method of claim 1, wherein the two sensor units are located in an array.

7. The method of claim 1, wherein each sensor unit further comprises a readout circuit block.

8. The method of claim 1, wherein each of the two sensor units further comprises an affinity molecule specific to one of the two biomarkers.

9. The method of claim 8, wherein the affinity molecule is a ligand or a probe.

10. The method of claim 9, wherein the ligand is a protein, antibody, aptamer, DNA, RNA, or molecule with specific functional group.

11. The method of claim 1, wherein the operation condition is tuned by adjusting condition selected from the group consisting of: chemical modification, buffer, charge, temperature, pH, ionic concentration, flow rate, surfactant, additive chemicals and a combination thereof.

12. The method of claim 1, wherein each of the two signals is electric current, electric potential, electric voltage, electric conductivity, electric field, electric capacitance, electric current, electron, or electron hole.

13. The method of claim 1, wherein the binding affinities are represented by coefficients and constants of binding curves of the series of known concentrations of the two biomarkers to the two sensor units, respectively.

14. A sensing system for distinguishably detecting two biomarkers with cross-reactivity in a biological sample, comprising: two sensor units specific to the two biomarkers, respectively, each sensor unit comprising a transducer on a surface thereof, a readout circuit, a control and calculation block; wherein the control and calculation block is a non-transitory computer-readable medium storing program comprising: code for receiving information describing two signals corresponding to the biomarkers obtained from the method of claim 1 and code for calculating the concentrations of the two biomarkers in the biological sample with the two signals and the binding affinities;

wherein the two sensor units comprise a first sensor unit specific to a first biomarker and a second sensor unit specific to a second biomarker, and the code for calculating the concentration C1 of the first biomarker and the concentration C2 of the second biomarker in the biological sample performs resolving the following equations;

$$S1 = (\alpha 11 \times C1 + \beta 11) + (\alpha 21 \times C2 + \beta 21)$$
$$S2 = (\alpha 12 \times C1 + \beta 12) + (\alpha 22 \times C2 + \beta 22)$$

wherein a binding curve of a series of known concentrations of the first biomarker to the first sensor unit to provide a coefficient $\alpha 11$ and a constant $\beta 11$, a binding curve of a series of known concentrations of the first biomarker to the second sensor unit to provide a coefficient $\alpha 12$ and a constant $\beta 12$, a binding curve of a series of known concentrations of the second biomarker to the first sensor unit to provide a coefficient $\alpha 21$ and a constant $\beta 21$, a binding curve of a series of known concentrations of the second biomarker to the second sensor unit to provide a coefficient $\alpha 22$ and a constant $\beta 22$, under the operation condition where the first biomarker is positively charged and the second biomarker is negatively charged, the biological sample with the first sensor unit under the operation condition produces a first signal S1 and with the second sensor unit under the operation condition produces a second signal S2.

15. The sensing system of claim 14, wherein the transducer is a field effect transistor.

16. The sensing system of claim 14, wherein the two sensor units are located in an array.

17. The sensing system of claim 14, wherein each of the sensor units further comprises an affinity molecule specific to one of the two biomarkers.

18. The sensing system of claim 17, wherein the affinity molecule is a ligand or a probe.

19. A method of detecting or diagnosing if a subject has, or is at risk of developing a disease or assessing a prognosis of the disease, comprising the method of claim 1, wherein the disease relates to at least one of the two biomarkers.

* * * * *